Figure 1:
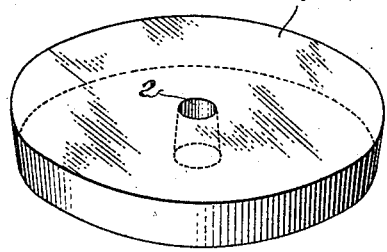

H. C. GALLAGHER.
TRANSPORTATION CASE.
APPLICATION FILED JUNE 10, 1914.

1,134,525.

Patented Apr. 6, 1915.

Witnesses:
H. C. Bowser.
A. H. McGlinchey.

Inventor:
Hugh C. Gallagher
by his attorney
Charles F. Richardson

UNITED STATES PATENT OFFICE.

HUGH C. GALLAGHER, OF MILTON, MASSACHUSETTS.

TRANSPORTATION-CASE.

1,134,525.  Specification of Letters Patent.  Patented Apr. 6, 1915.

Application filed June 10, 1914. Serial No. 844,373.

*To all whom it may concern:*

Be it known that I, HUGH C. GALLAGHER, citizen of the United States, residing at Milton, in the county of Norfolk and State of Massachusetts, have invented certain new and useful Improvements in Transportation-Cases, of which the following is a specification, reference being had therein to the accompanying drawings.

One of the principal features of my invention relates to the manufacture of chocolate in bulk, and it resides in the particular shape given to a mass of chocolate, whereby when in molten condition, the chocolate may cool comparatively quickly, solidify and have throughout a desired uniform texture; and, when cool, may be most economically packed in cases for transportation and storage. This feature is described and claimed in a divisional application filed by me February 10, 1915, series of 1915, No. 7,448.

It has been common practice, when chocolate was to be sold in bulk, to mold the chocolate into rectangular cakes, say $9\frac{3}{4}'' \times 18\frac{1}{4}'' \times 1\frac{3}{4}''$ and weighing ten lbs. each; and then to place them in a wooden box of corresponding length and breadth, and deep enough to hold, for example ten pieces. But when so shaped and packed, the chocolate frequently breaks during handling and transportation; while the corners of the boxes may be easily pried up sufficiently to permit pieces of the chocolate to be purloined. Further, the boxes themselves are not of the most economical form, as to weight, and amount of wood required, and after the chocolate is removed, they become useless to the purchaser. In attempting to overcome these objections, applicant caused the chocolate to be molded into a solid disk, adapted to be contained in barrels, and having its thickness increased over that of the cake chocolate; but it was found that the texture of the disk was not uniform throughout, especially its central portion; and that greater time was required for the disk to cool. To remove these objectionable conditions, various other experiments were made; finally one met with success, viz., that of casting the chocolate in the form of a ring, instead of a disk, so that not only was the heat radiating surface of the mass of chocolate near its center, increased in area an amount equal to that of the sides of the hole of the ring; but there was absent and consequently not to be radiated, the heat that would otherwise have been in the material removed from the center of the disk to gain this increase in heat radiating surface for the ring. In other words, as between a disk, and a ring, of molten chocolate of the same diameter and thickness, the ring has fewer inherent heat units, and a greater heat radiating surface at its central portion than has the disk. Consequently, it will cool quicker than the disk, and have, as a fact, a uniform texture throughout, whereas the disk will not. And further the ring shape is most desirable for transportation purposes in that it allows the use of a cylindrical packing case, and a standard or stay in the longitudinal axis of the case. The advantages of such a receptacle are that a cylinder of given capacity, has less material in its construction than does a rectangular box, costs less, weighs less, hence freightage is less; and at the same time the stay, while aiding in giving rigidity to the case and, further, in reducing the necessity of so much material in the case, and hence its cost, also serves for centering and transversely supporting, yieldingly to a certain extent, the contained chocolate rings. Such a case and standard for chocolate in bulk embody another feature of my invention.

A third feature is found in combining with the case and longitudinal standard fixed to the top and bottom heads of the case as by nails, a slip of paper or other suitable label, pasted over the nail head and secured to the head of the case, for the purpose of concealing the nail and preventing the prying up of the head to withdraw the contained chocolate, without an obvious mutilation of the label.

Figure 2:
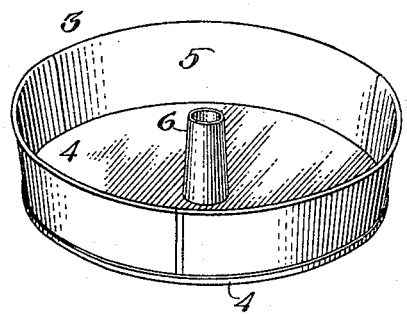
Figure 4:
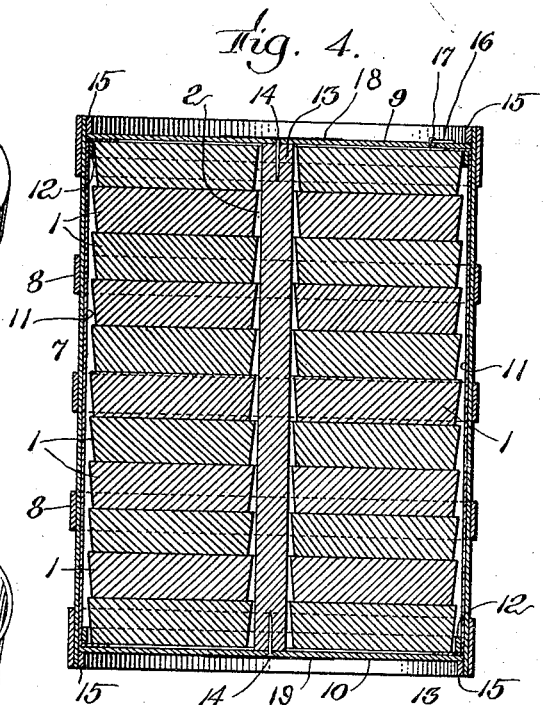
Figure 5:
Figure 3:
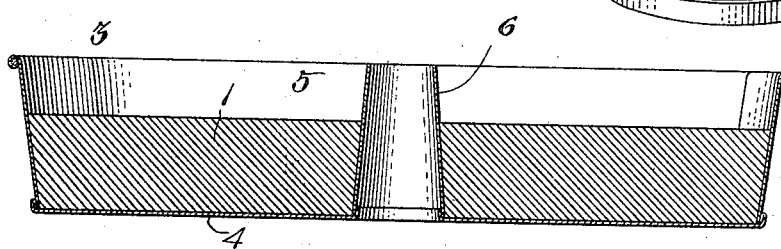

In the drawings illustrating the principle of my invention and the best mode now known to me of embodying the same in operative structure, Figure 1 is a perspective view of a mass of chocolate in bulk, the form of which embraces the first part of my invention. Fig. 2 illustrates in perspective a metal mold of the shape desired to give the chocolate the shape shown in Fig. 1. Fig. 3 is an enlarged vertical section of the mold with chocolate contained therein. Fig. 4 shows in vertical section, a tier of rings of chocolate securely mounted on a standard, in a cylindrical case, constituting the second feature of my invention. Fig. 5 is a perspective view of the case with protecting label on its head, and embodies the third feature of my invention.

A mass of chocolate 1, having the preferred shape, is illustrated in Fig. 1. Its form is that of a thin frustum of a cone, pierced by a vertical hole 2 at its center, of similar form, but inverted. The mean diameter of the ring is about $17\frac{1}{4}$ inches; its thickness, $2\frac{1}{2}$ inches, and its weight about twenty lbs., while the mean diameter of the hole is about two inches. To give it its shape, a metallic mold or pan 3 of corresponding form is provided. It is of the ordinary tin-pan construction, with a bottom 4, upwardly and outwardly flaring sides 5, and a central opening in its bottom, closed from within the mold, by a hollow core 6 having the shape and size of the hole through the ring, i. e. a frustum of a cone, inverted in relation to that formed by the sides of the mold.

Obviously, the chocolate ring, may be formed by pouring chocolate, in a melted state, into the pan 4, as shown in Fig. 3, the temperature of the room where this takes place being, say, 70° Fahrenheit. To cool, it is removed to another room having a temperature of about 40° Fah. Here it remains, for example, eight hours; the heat of the chocolate, radiating from all of its surfaces; that heat whose flow is controlled by the presence of the hollow core 6, being radiated in such a way as to leave the texture of the chocolate of the central portion, substantially the same as that of the rest of the ring. In this manner, the first condition required, is fulfilled. Simultaneously, the chocolate is given its exterior shape, that of the frustum of a cone; which is the second condition demanded.

It is to be noted that the sides of the mold and core are flaring, and for convenience, must be so, to allow the solidified chocolate to be "drawn"; but they are not so because of any requirement of the invention. A ring of chocolate with cylindrical sides, and central opening, if such could be conveniently made, would embody the first feature of my invention.

The second feature clearly appears in Fig. 4. A case or receptacle 7 is made of thin wooden staves, is cylindrical in form, and slightly larger in diameter than the extreme diameter of the rings 1. Hoops 8 encircle it, and top and bottom heads 9, 10, close its open ends. The inside is lined with heavy paper 11, and there held by two hoops 12 near the ends of the case, which also serve as abutments for the heads. A wooden standard or stay 13, smaller in diameter than the holes 2 through the chocolate rings, is removably secured in longitudinal axis of the case as by large nails 14 passing through the heads into the end portions of the standard; lock hoops 15, also, tend to hold the case heads in place, while a hand ring 16 and staple 17 aid in the removal of the head forming the top of the case.

How the rings of chocolate are packed in the case is apparent from an inspection of Fig. 4. The top head 9 being assumed to have been removed, rings 1, 1, are slipped down over the standard 13 into the case, until it is filled; the standard tending to hold the rings out of contact with the sides of the case; next the top head is pushed against the abutting ring 12; a nail 14 driven through the head into the top end of the standard, and the lock hoop 15 nailed into place.

Over each nail head 14, 14, Figs. 4 and 5, in the top and bottom case heads 9 and 10, is pasted a paper label 18, 19, to conceal it, and to show absolutely whether the head has been tampered with, for the head can not be removed without a destruction of the label. This structure embraces the third part of my invention.

Having described my invention, and all of its advantages, heretofore mentioned; and desiring to protect it in the broadest manner legally possible, what I claim is:

1. In a case having a removable end; a standard fixed within the case and secured to the removable end, as by a nail; and a label pasted over the head of the nail, to prevent a removal of the end without an obvious mutilation of the label.

2. In a case with removable top and bottom; a standard removably secured, as by a nail, to the bottom of the case, in the longitudinal axis of the case; the top or cover being removably secured to the opposite end of the abutting standard, as by a nail; and a label pasted over the head of each nail securing the standard to the top or bottom of the case; to prevent a removal of the top or bottom of the case without an obvious mutilation of the label.

3. A case with removable top and bottom; a standard removably secured, as by a nail, to the bottom of the case in the longitudinal axis of the case; and designed to retain securely, a series of separate rings of chocolate, the outside and the inside diameter of each ring being slightly less than that of the case, and greater than that of the standard, respectively; said rings to be stacked within the case, on the standard, and filling the case; a top or cover removably secured to the opposite end of the abutting standard, as by a nail; and a label pasted over the head of each nail securing the standard to the top or bottom of the case;

to prevent a removal of the top or bottom of the case without an obvious mutilation of the label.

4. In a case having a removable end; a standard fixed within the case, and secured to the removable end, as by a nail; and a slip of suitable material covering the head of the nail, and secured to the end of the case; to prevent a removal of the end without an obvious mutilation of the slip.

In testimony whereof I hereunto affix my signature in the presence of two witnesses.

HUGH C. GALLAGHER.

Witnesses:
   WILLIAMS B. BROOKS, Jr.,
   CHARLES F. RICHARDSON.

Copies of this patent may be obtained for five cents each, by addressing the "Commissioner of Patents, Washington, D. C."